US 6,634,136 B2

(12) United States Patent  (10) Patent No.: US 6,634,136 B2
Barrett et al.  (45) Date of Patent: Oct. 21, 2003

(54) DOWNRIGGER LINE CLAMP WITH ADJUSTABLE CLAMPING FORCE

(75) Inventors: John Barrett, Sooke (CA); Siegfried Bulling, Sidney (CA); Kevin Anthony Davis Scott, Sidney (CA)

(73) Assignee: Scott Plastics Ltd. (CA)

( * ) Notice: Subject to any disclaimer, the term of this patent is extended or adjusted under 35 U.S.C. 154(b) by 0 days.

(21) Appl. No.: 09/849,385

(22) Filed: May 4, 2001

(65) Prior Publication Data

US 2002/0162271 A1 Nov. 7, 2002

(51) Int. Cl.⁷ ............................................. A01K 91/08
(52) U.S. Cl. ........................................... 43/43.12
(58) Field of Search ........................... 43/43.12; 24/499

(56) References Cited

U.S. PATENT DOCUMENTS

| 2,170,594 | A | * | 8/1939 | Nicholson | 43/43.12 |
|---|---|---|---|---|---|
| 2,605,568 | A | * | 8/1952 | Riley | 43/43.12 |
| 2,749,649 | A | * | 6/1956 | Fitzsimmons | 43/43.12 |
| 2,925,682 | A | * | 2/1960 | Kravitch | 43/43.12 |
| 2,958,973 | A | * | 11/1960 | Le May | 43/43.12 |
| 3,302,648 | A | * | 2/1967 | Nelson | 294/99.2 |
| 3,357,126 | A | * | 12/1967 | Klieves | 43/43.12 |
| 3,367,337 | A | * | 2/1968 | Javna et al. | 24/499 |
| 3,392,727 | A | * | 7/1968 | Hanlon | 24/499 |
| 3,653,389 | A | * | 4/1972 | Shannon | 294/99.2 |
| 3,817,078 | A | * | 6/1974 | Reed et al. | 294/99.2 |
| 4,212,305 | A | * | 7/1980 | Lahay | 606/210 |
| 4,565,026 | A | * | 1/1986 | Bohme | 43/17.2 |
| 4,698,933 | A |  | 10/1987 | Shaw |  |
| 4,825,583 | A |  | 5/1989 | Kammeraad |  |
| 5,060,329 | A | * | 10/1991 | Hudson | 294/99.2 |
| 5,152,095 | A | * | 10/1992 | Combs, III | 43/43.12 |
| 5,163,246 | A |  | 11/1992 | Shaw |  |
| 5,179,768 | A | * | 1/1993 | Jio | 24/499 |
| 5,197,223 | A | * | 3/1993 | Spurgeon | 43/43.12 |
| 5,784,826 | A |  | 7/1998 | Walker |  |
| 5,855,046 | A | * | 1/1999 | Dymott et al. | 24/499 |
| 5,921,015 | A |  | 7/1999 | Newell et al. |  |
| 5,950,349 | A |  | 9/1999 | Walker |  |
| 5,979,104 | A |  | 11/1999 | Walker |  |
| 6,174,321 | B1 | * | 1/2001 | Webb | 606/210 |
| 6,192,619 | B1 | * | 2/2001 | Pirkle | 43/43.12 |

OTHER PUBLICATIONS

Scotty, 1999 Fishing, Marine and Outdoor Products, Catalogue, Jan. 1999, cover and pp. 11 and 12, Canada.

* cited by examiner

Primary Examiner—Darren W. Ark
(74) Attorney, Agent, or Firm—Robert H. Barrigar

(57) ABSTRACT

The invention described relates to a downrigger line clamp mechanism used in downrigger fishing and includes an adjustable clamping force for adjusting the overall release tension of a fishing line. The pre-stressed line clamp mechanism includes a pair of pivotally engaged, elongate arms which, when assembled, are resiliently flexed such that one portion of the arms, the proximal grip portions, are outward bowed, the tips of the proximal grip portions pinching together, thereby biasing another portion of the arms, the jaws, towards a closed clamp position. The line clamp mechanism uses an adjustable compression-force biasing device movably mounted between the tips of the proximal grip portions of the arms. The biasing device may include spacers of different spacing dimensions, each spacer being positionable into an active position between the tips of the proximal grip portions of the arms by moving the biasing device relative to the arms. The magnitude of clamping force at the jaws is adjustable by adjusting the spacing between the tips of the proximal grip portions of the arms.

34 Claims, 7 Drawing Sheets

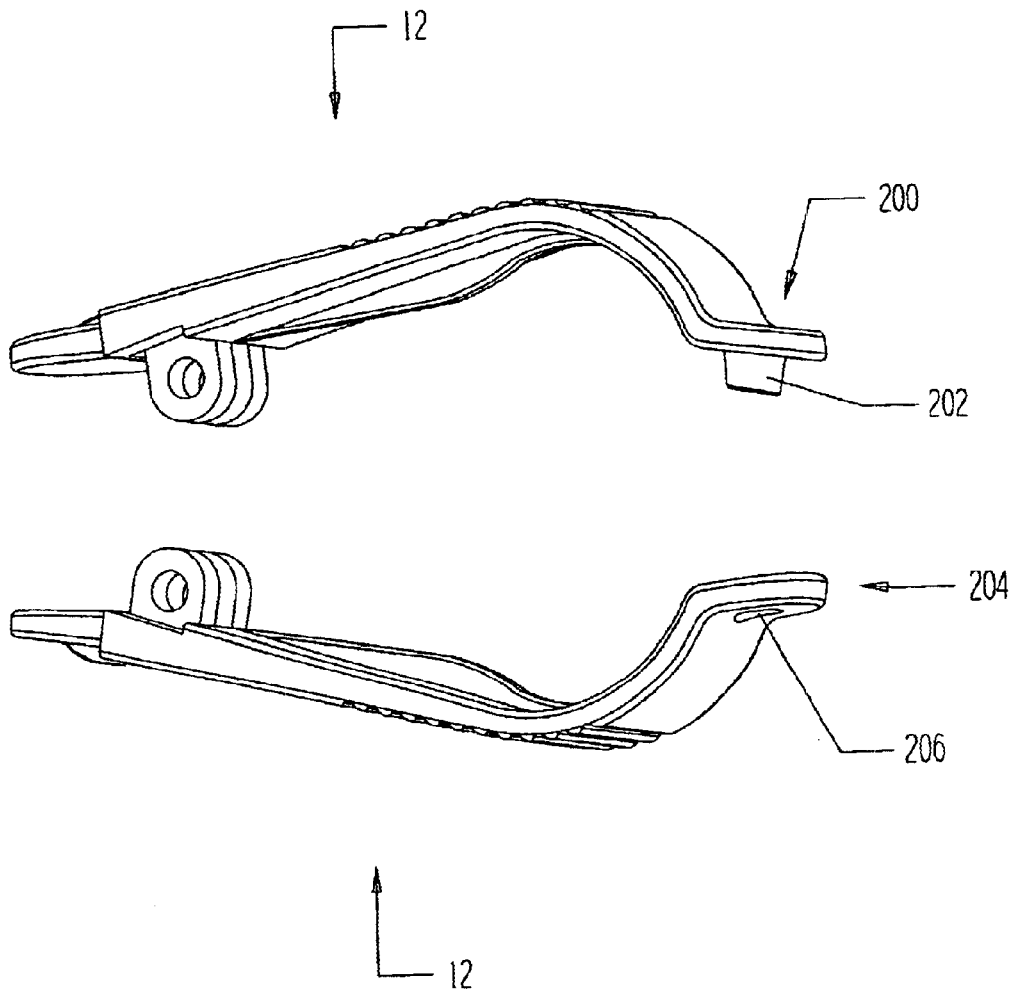

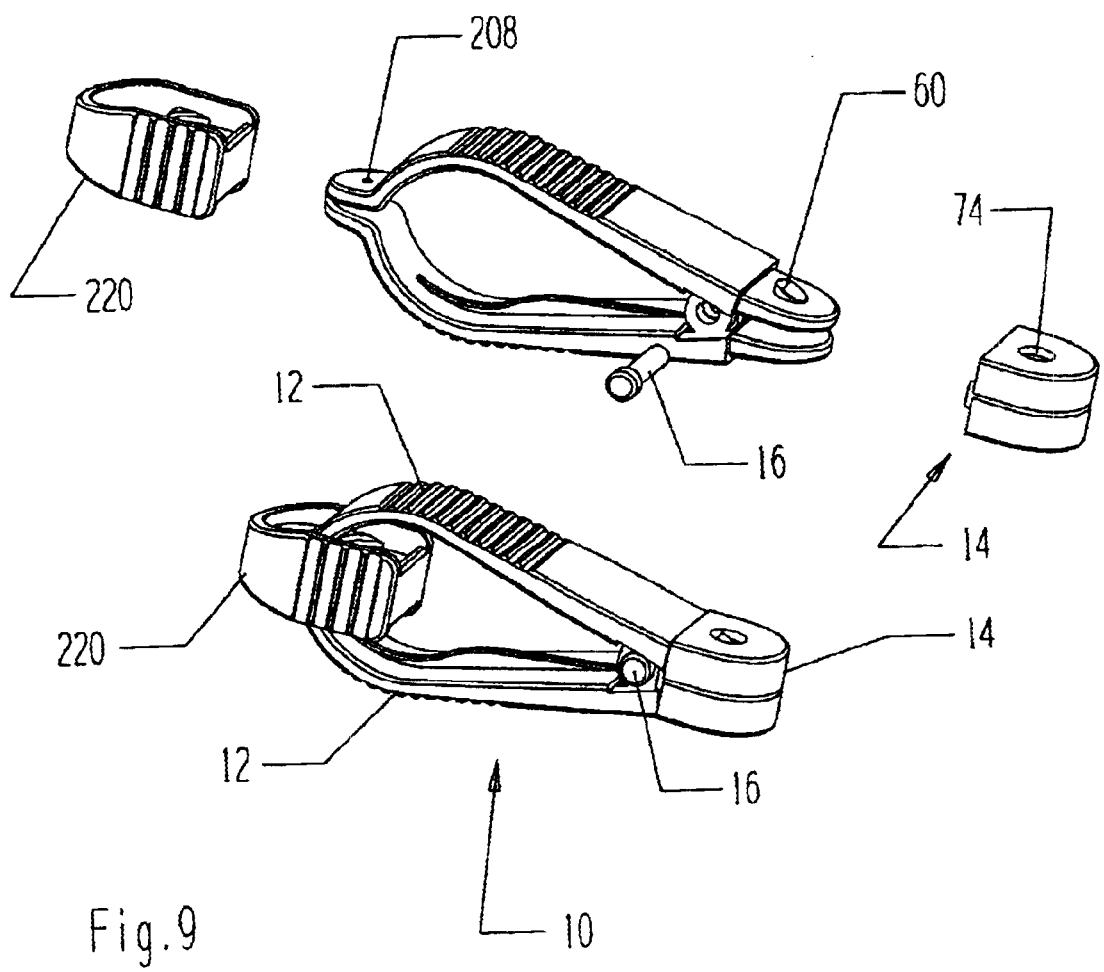

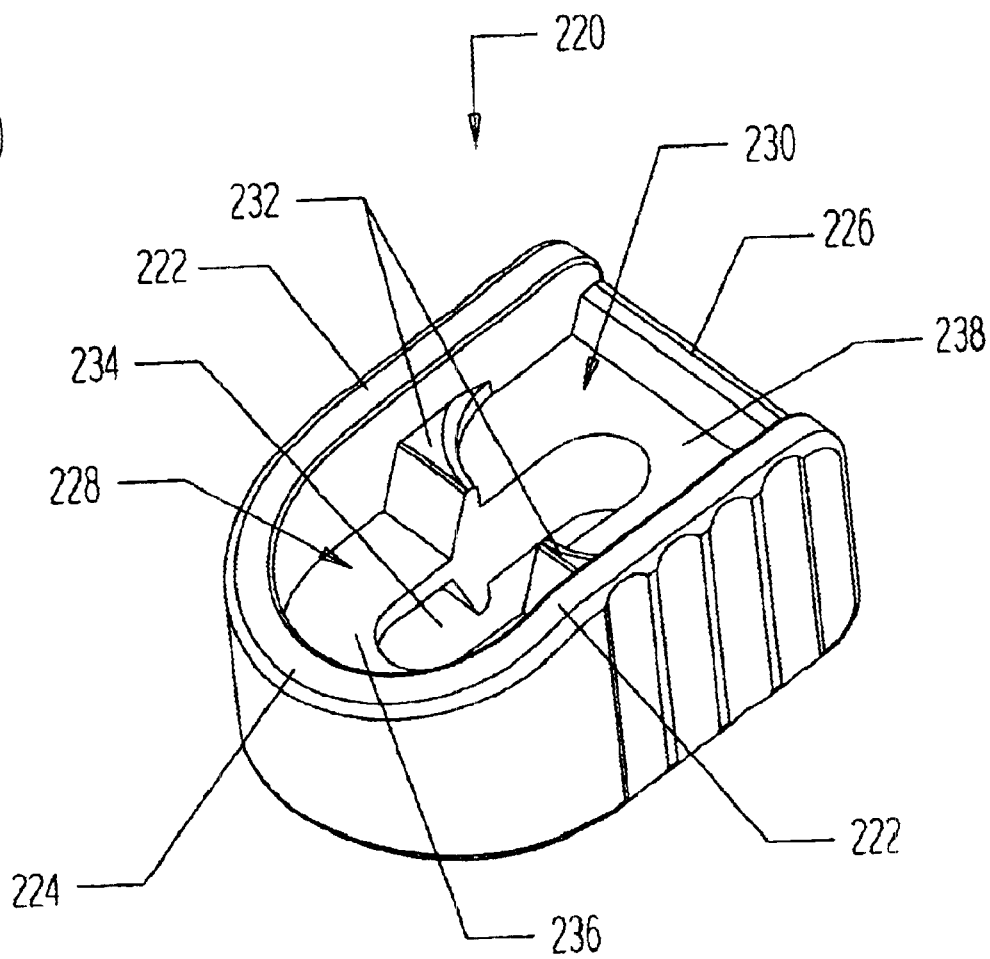

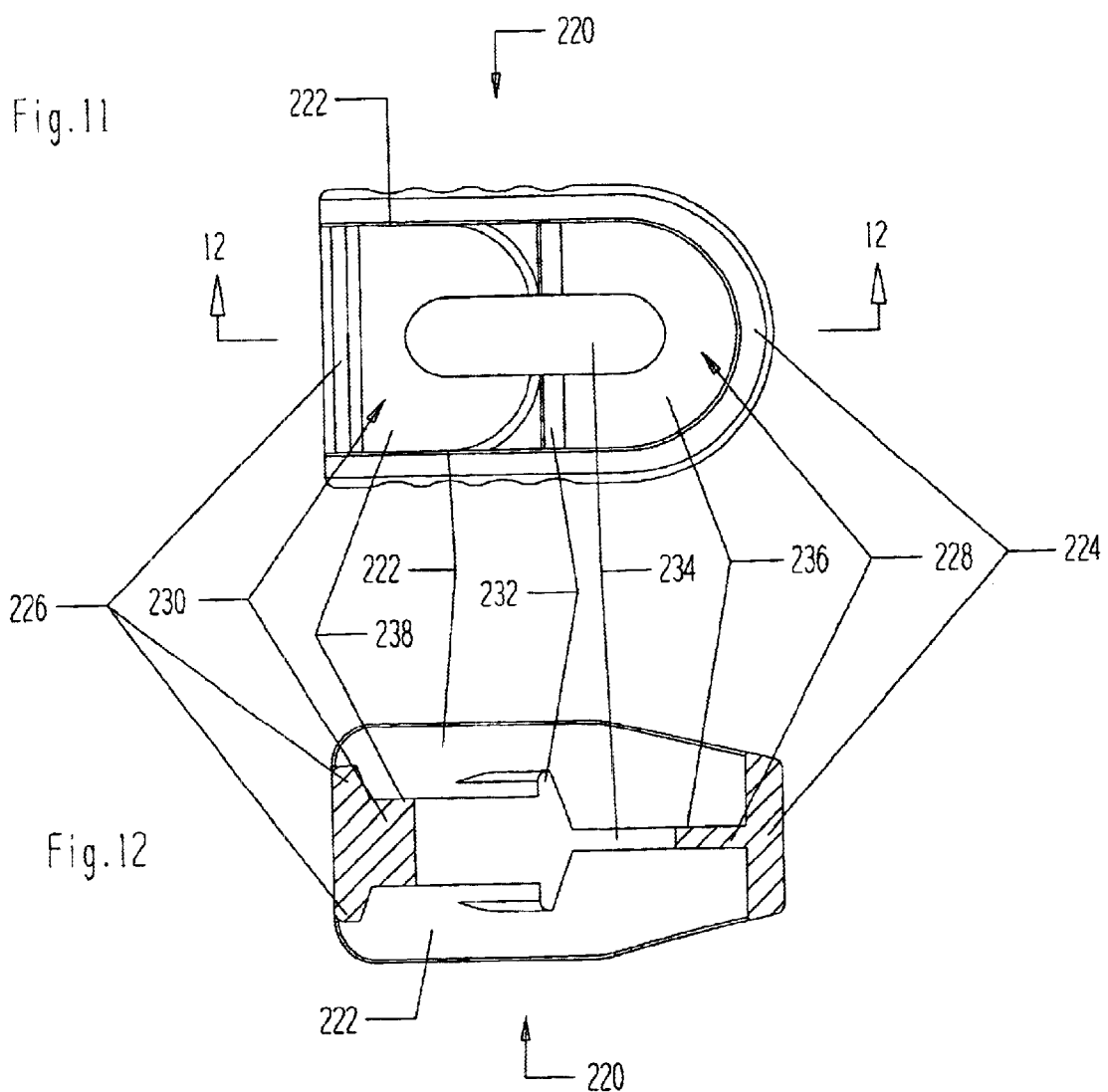

DOWNRIGGER LINE CLAMP WITH ADJUSTABLE CLAMPING FORCE

FIELD OF THE INVENTION

The invention relates generally to a downrigger line clamp mechanism used in downrigger fishing.

BACKGROUND OF THE INVENTION

When trolling for fish, a downrigger assembly can be used to control the depth at which the lure is trolled through the water. A downrigger typically comprises a weight suspended from the boat by a downrigger cable; and a leader line, one end of which is clipped to the downrigger cable and the other end of which is clipped to the fishing line, typically 10 to 30 feet from the lure, with a line clamp. When trolling with a downrigger, the fishing line runs substantially vertically from the fishing rod to the line clamp and substantially horizontally (depending on the trolling speed, and the drag of the lure and line) from the release clamp to the lure.

When a fish is hooked, it is necessary for the line clamp to release the fishing line so that fish can be played free of the hindrance of the weight, and brought aboard without tangling the fishing line and the cable. To operate properly, the line clamp must retain the fishing line during trolling and release the fishing line when a fish strikes the lure. Typically, persons fishing desire different line clamp release tensions depending on the fishing technique and the type of fish being sought. It is therefore advantageous to be able to adjust the line clamp release tension.

Most downrigger line clamps use a coil compression spring to bias two pivoting clamping surfaces towards a closed position wherein a fishing line may be frictionally held between the clamping surfaces. Such systems are described in U.S. Pat. No. 5,784,826 (Walker, Jul. 28, 1998), U.S. Pat. No. 5,950,349 (Walker, Sep. 14, 1999), U.S. Pat. No. 5,979,104 (Walker, Nov. 9, 1999), U.S. Pat. No. 4,698,933 (Shaw, Oct. 13, 1987), and U.S. Pat. No. 5,163,246 (Shaw, Nov. 17, 1992).

With the foregoing line clamps, the friction holding the fishing line between the clamping surfaces will vary depending upon the character and condition of the line as well as the specifics of the surface-to-surface contact of the clamping surfaces with the line that happen to occur in a given clamping event. In other words, for a given clamping compressive force, the force of friction will vary from one clamping event to the next, and consequently the line release force will also vary somewhat.

The pivot-based line clamps of the foregoing sort enable the person using them to vary the release tension by changing the position of the fishing line between the clamping surfaces. Specifically, a fishing line is more readily released from between the clamping surfaces if the fishing line is positioned near the ends of the clamping surfaces than if the fishing line is positioned closer to the pivot. The leverage is greater and the release tension is higher near the pivot point than they are further away from the pivot point.

It is therefore possible to make minor adjustments to the line clamp release tension by carefully positioning the fishing line between the clamping surfaces. In practice, however, such previously known pivot-type clamps are effective to provide only a fairly limited range of release tensions. Accordingly, several of these aforementioned patented systems describe additional structure and/or techniques for enabling various release tensions of the fishing line, namely by providing auxiliary means for adjusting the compression force between the clamping surfaces. In particular, U.S. Pat. Nos. 5,784,826, 5,950,349, and 5,979,104 describe a cam lever adjustment assembly wherein a threaded rod is inserted through a bore through the clamping surfaces. The ends of the threaded rod protrude from the outer clamping surfaces and may be threadedly engaged by any one of a number of different types of internally threaded rod caps each of which may be tightened or loosened to vary the compression adjustment between the clamping plates. Typically, the rod caps have wings, knurled surfaces or other projections, to make it easier to turn them by hand.

One disadvantage of the aforementioned prior designs is that the compression force adjustment devices are somewhat finicky to operate, which can be a hindrance for a fisherman whose hands are already occupied with fishing line, lures, flashers, and bait, and whose hands may be somewhat greasy as a consequence.

Furthermore, the aforementioned designs do not permit a smooth flow of water over the surfaces of the line clamp. In the aforementioned designs, coil springs, thumb or wing nuts, and levers protrude beyond the body of the fishing line clamp, thereby causing turbulence around the line clamp as it passes through the water. An unbalanced line clamp or a line clamp that is not streamlined may twist the fishing line and reduce the performance of the lure. Furthermore, a fishing line may hang up the protrusions of the line clamp, thereby leading to tangled lines.

Another type of prior line clamp is described in U.S. Pat. No. 5,921,015 (Newell et al., Jul. 13, 1999). As with the aforementioned line clamp designs, this patent describes a line clamp having two pivoted clamping plates between which a fishing line may be frictionally held. Unlike the aforementioned designs, however, rather than using a coil compression spring to clamp together the plates, the elongated clamping plates are sandwiched together by a rigid sliding clamp that slides along the outer surfaces of the elongated clamping plates from the pivot towards the ends of the plates and locks in place when the clamp is in the correct position to provide a desired clamping force.

As with the previously mentioned coil-spring-based line clamp, the line clamp described in U.S. Pat. No. 5,921,015 is fairly complex and expensive to manufacture; the overall shape of the line clamp is not streamlined and the sliding clamps are difficult to operate.

What is required is a simple, streamlined line clamp with a simple, easy-to-operate compression force adjustment device that enables a suitable range of release tensions of the fishing line.

SUMMARY

An object of the invention is to provide a line clamp mechanism having means for adjusting the line clamp compression force that is simple, streamlined and relatively inexpensive to manufacture. As in other previously known downrigger clamp designs, the fishing line is releasably frictionally held within the downrigger line clamp, permitting the fishing line to be pulled from the downrigger line clamp by a fish striking the lure. According to one aspect of the invention, there is provided a pre-stressed line clamp mechanism having the following components:

(a) first and second elongate arms each made of suitable selected elastic material and each having a clamping jaw at its distal end, a compression-adjusting end at its proximal end, and an outwardly bulging arcuate grip portion intermediate the clamping jaw and the compression-adjusting end;

the second elongate arm being longitudinally generally coextensive with the first elongate arm, and oriented in opposition to the first elongate arm so that, the clamping jaws of the two arms present opposed clamping faces, preferably generally planar and generally parallel to one another, suitable for clamping a line therebetween, and the compression-adjusting ends of the two arms present opposed abutting surfaces;

(b) a coupling means such as a pivot pin or equivalent on which both the arms are pivotally mounted, to provide pivoting of the distal portions of the arms through a small angular range about a pivotal axis located near the distal ends of the arms, the clamping jaws extending distally away from the pivot pin and the grip portions extending proximally away from the pivot pin;

the outwardly-bulging grip portions of the opposed arms forming a grip that under compressive force exerted by the user's hand forces disengagement of the clamping faces to permit insertion or release of a fish line, and in rest position are stressed so as to exert a compressive force against one another at the abutting surfaces, thereby biassing the clamping jaws together toward a closed clamping position in which clamping force may be applied to a fish line inserted and held between the clamping faces; the amount of clamping force being variable with distance from the pivot pin; the material, shape and dimensions of the arms being selected so that within engineering tolerances, the compressive force exerted by the clamping jaws on the fish line, and consequently the release tension of the fish line, are within predetermined selected ranges;

(c) leader line attachment means connected to the proximal end of at least one of the arms and preferably both arms; and (d) an adjustable compression-force biassing device movably mounted between the compression-adjusting ends of the arms, the biassing device having one or more spacers, or one or more spacers and an abutment opening within which the opposed abutting surfaces of the compression-adjusting ends can abut, so as to selectably provide at least two different spacing dimensions between the abutting surfaces of the compression-adjusting ends; one bearing surface of each said spacer making sliding contact with an abutting surface of the compression-adjusting end of an associated one of the arms, and the other bearing surface of each said spacer making sliding contact with an abutting surface of the compression-adjusting end of the other of the arms; each spacer or abutment opening being positionable into an active position relative to the abutting surfaces of the compression-adjusting ends by moving the biassing device distally or proximally relative to the arms;

wherein the magnitude of the compression force exerted by the jaws is adjustable by adjusting the distal/proximal position of the biassing device relative to the arms.

In a preferred embodiment, the adjustable compression-force biassing device is mounted for distal/proximal displacement relative to the arms, the spacers, or the spacers and the abutment opening, being disposed in longitudinal series, each spacer or the abutment opening occupying a short portion of the longitudinal length of the biassing device and in turn brought into active position as the biassing device is proximally or distally displaced. Further, to prevent unwanted proximal or distal displacement that could, if permitted, present an unwanted spacer or the abutment opening in the active position relative to the abutting surfaces of the compression-adjusting ends, the biassing device is provided with active position stabilizers, such as ridges that engage mating slots, steps, rails, abutments or the like, that impede longitudinal displacement of the biassing device once a selected spacer is in the active position. The user may, by exerting a proximally or distally directed force on the biassing device, move the biassing device so that the spacer, or the abutment opening, that was in active position is displaced out of active position and replaced by the next spacer in the series.

For most purposes, a biassing device that includes two different spacers in longitudinal series, or an abutment opening and a spacer in longitudinal series; and therefore provides two available different line clamping forces at any given position of the line between the clamping jaws, suffices.

Also in the preferred embodiment, sleeves or sheaths are provided for the clamping jaws that envelope the clamping jaws. These sleeves or sheaths may advantageously be provided with relatively high-friction clamping surfaces overlying the clamping faces of the clamping jaws. A securing device such as a slot in the sleeve or sheath that engages a projection on the outward-facing side of the associated clamping jaw impedes unwanted removal of the sleeve or sheath from the clamping jaw. Reference in this specification to the clamping jaws or the clamping faces should be understood to include the possibility that the composite clamping jaws may include such sleeves or sheaths and that the clamping surfaces are formed by opposed relatively flat portions of the sleeves or sheaths. The sleeves or sheaths provide enhanced gripping and increased cushioning of the fishing line.

The shape, dimensions and material of the arms are selected to enable the arms to resiliently flex when the line clamp mechanism is being assembled, thereby to pre-stress the clamping mechanism. What has been referred to in the interest of simplification as a "pivot pin" is preferably a pair of gudgeons, a respective one of which is moulded on each arm proximally to the clamping jaw, and a pin insertable through the gudgeons to provide the pivoting connection. The stress occurs because when the arms are not attached to each other and are disposed in relaxed opposed relationship with their compression-adjusting ends in contact and their clamping surfaces in contact, the bow-like shaping of the arms from one end to another results in a misalignment of the gudgeon holes in the first arm with the gudgeon holes in the second arm, in that the portion of each arm proximate to the gudgeons is outward of the position where the gudgeon holes would align. The arms must be forced inwardly toward one another to enable them to be coupled together by the pivot pin. The result, when the arms are thus coupled together, is a compressive force exerted by the clamping jaws. This compressive force may be released by pressing the gripping portions of the arms inwardly toward one another. The rest compressive clamping force may be adjusted by adjusting the spacing between the compression-adjusting ends of the arms, and this spacing adjustment is accomplished in the preferred embodiment by varying the longitudinal position of the biassing device, thereby to provide as many different spacings between the compression-adjusting ends of the arms as there are spacers. Further note that, as mentioned above, in one position of the biassing device, there need not be a spacer interposed between the compression-adjusting ends; these ends may abut one another within the abutment opening.

Preferably, each arm is smoothly convexly outwardly curved to distribute the stress throughout the arm, and to provide an aesthetically pleasing design that is both streamlined (for facilitating minimization of turbulence as the line clamp passes through the water), and ergonomic (for ease of gripping and squeezing). The arms desirably have maximum curvature towards their proximal ends and may suitably straighten in the vicinity of the pivot pin. Other shapes may better facilitate minimization of turbulence. Other shapes may be selected at the preference of the designer if they at least provide a suitable gripping means and downrigger attachment means, provide the requisite resilient flexing when the line clamp mechanism is being assembled, and provide pre-stressing of the arms when assembled so that a compressive force exists between the clamping jaws, releasable upon compression of the gripping means. The arms are preferably moulded from a hard durable plastic material such as a suitable acetal resin or composite, but may also be suitably formed by other known means, and made from other similarly resiliently flexible and durable materials. The transverse dimension of each arm may be varied from distal to proximal end to provide adequate surface contact of the line within the clamping jaws while avoiding a cumbersome grip. The thickness of the arms may be varied, preferably ranging from a maximum in the vicinity of the clamping jaws and a minimum near the compression-adjusting ends of the arms, for ease of squeezing. The inner portions of the arms on the proximal side of and nearer the pivot pin may be provided with proximally/distally extending stiffeners for greater resistance to flexing in those portions of the arms.

In this specification, including the claims, the following words have the following meanings:

(a) The words "distal" and "proximal" refer to the respective ends and proximate parts of the line clamp relative to the position of the downrigger cable when the line clamp is in use. The distal end of the line clamp is the end of the line clamp that is furthest from the downrigger cable during normal trolling, and the proximal end of the line clamp is the end of the line clamp that is closest to the downrigger cable during normal trolling. "Proximal/distal" and "distal/proximal" both refer to directions that are substantially toward the proximal end or the distal end of the line clamp, as the case may be.

(b) The words "inward" and "outward" are used relative to an imaginary plane roughly defined by the opposed contacting jaw surfaces of the clamp, the imaginary plane being perpendicular to the compressive clamping force. An inward direction is one towards the imaginary plane from either side of the imaginary plane. An outward direction is one away from either side of the imaginary plane.

(c) The transverse dimension is the dimension lying within the imaginary plane and perpendicular to the longitudinal dimension.

The leader line attachment means is suitably a hole through the compression-adjusting end of each arm. The biassing device is preferably moulded, with its spacer or spacers, as a single integral unit, and is configured so that it may be easily inserted and secured between the compression-adjusting ends of the arms, providing at its proximal end a relatively large opening that affords ample clearance for insertion of the leader line into the leader attachment means in the compression-adjusting ends of the arms. The terminating portions of the compression-adjusting ends of the arms may be slightly outwardly bent for ease of insertion of the biassing device therebetween.

In the operation of the line clamp mechanism according to this aspect of the invention, the jaws are opened to receive a fishing line by squeezing together the squeezable grip portions of the arms. The release tension required to release the fishing line from between the jaws of the line clamp is in part dependent upon the positioning of the fishing line within the jaws; the compression force of the jaws is less towards the distal ends of the jaws and increases in the proximal direction toward the pivot pin. Furthermore, the biassing device may be used to adjust the compression force between the jaws by moving one of the spacers thereof into an active position between the compression-adjusting ends of each arm; the greater the spacing dimension between the compression-adjusting ends of the arms, the higher the compression force between the jaws.

With line clamps where the release tension is low, the compressive force between the compression-adjusting ends is also relatively low and the compression-adjusting ends do not grip the biassing device as tightly as they do when the compressive force is relatively high. In a preferred embodiment, for use in line clamps where a low release tension is desired, the compression-adjusting end of one arm has an inwardly projecting peg and the compression-adjusting end of the other arm has a hole sized, shaped and positioned to slidably mateably engage the peg. The peg has a leader line hole through which a leader line can be inserted. The peg is contained within a slot in the biassing device and thereby acts to prevent the biassing device from being dislodged from between the compression-adjusting ends.

The invention as described above offers several features over the prior line clamp mechanisms. Firstly, since the compression force between the jaws is provided by the resilience of the plastic arms, the line clamp according to the preferred embodiment of the invention is suitably more streamlined than conventional line clamps which are required to incorporate coil springs, compression clamps and thumb, or wing, nuts into the design. Secondly, as opposed to the fishing line clamp pads as used in prior line clamps, the soft grip jacket functions both to cushion the fishing line as well as shield the fishing line from the pivot, thereby helping to reduce fishing line hangups. Thirdly, the line clamp mechanism includes a simple biassing device to adjust the compression force between the jaw surfaces of the line clamp mechanism thereby adjusting the amount of tension which is required to release the fishing line from between the jaws. Lastly, with the exception of the jacket, the entire line clamp mechanism is made from an acetal composite. All components of the line clamp mechanism may be made of materials selected to be essentially impervious to harm from immersion in fresh or salt water. The line clamp is relatively inexpensive to manufacture and easy to assemble, and may, if suitably designed in accordance with the teachings herein, be operated with one hand.

The various features of novelty that characterize the invention are pointed out with more particularity in the claims annexed to and forming part of this disclosure. For a better understanding of the invention, its operating advantages and specific objects attained by its use, reference should be made to the accompanying drawings and descriptive matter in which there are illustrated and described preferred embodiments of the invention.

SUMMARY OF THE DRAWINGS

FIG. 7 is a perspective view of the arms of an alternative embodiment of the line clamp suitable for use where a low release tension is desired.

FIG. 8 is a perspective exploded view of the components of an alternative embodiment of the line clamp including the arms shown in FIG. 7.

FIG. 9 is a perspective view of the assembled line clamp of FIG. 8.

FIG. 10 is a perspective view of the biassing device shown in FIG. 9.

FIG. 11 is a plan view of the biassing device shown in FIG. 10.

FIG. 12 is a transverse sectional view of the biassing device shown in FIG. 11 taken along the line 12—12 in FIG. 11.

DETAILED DESCRIPTION

Figures 1, 2, 3:
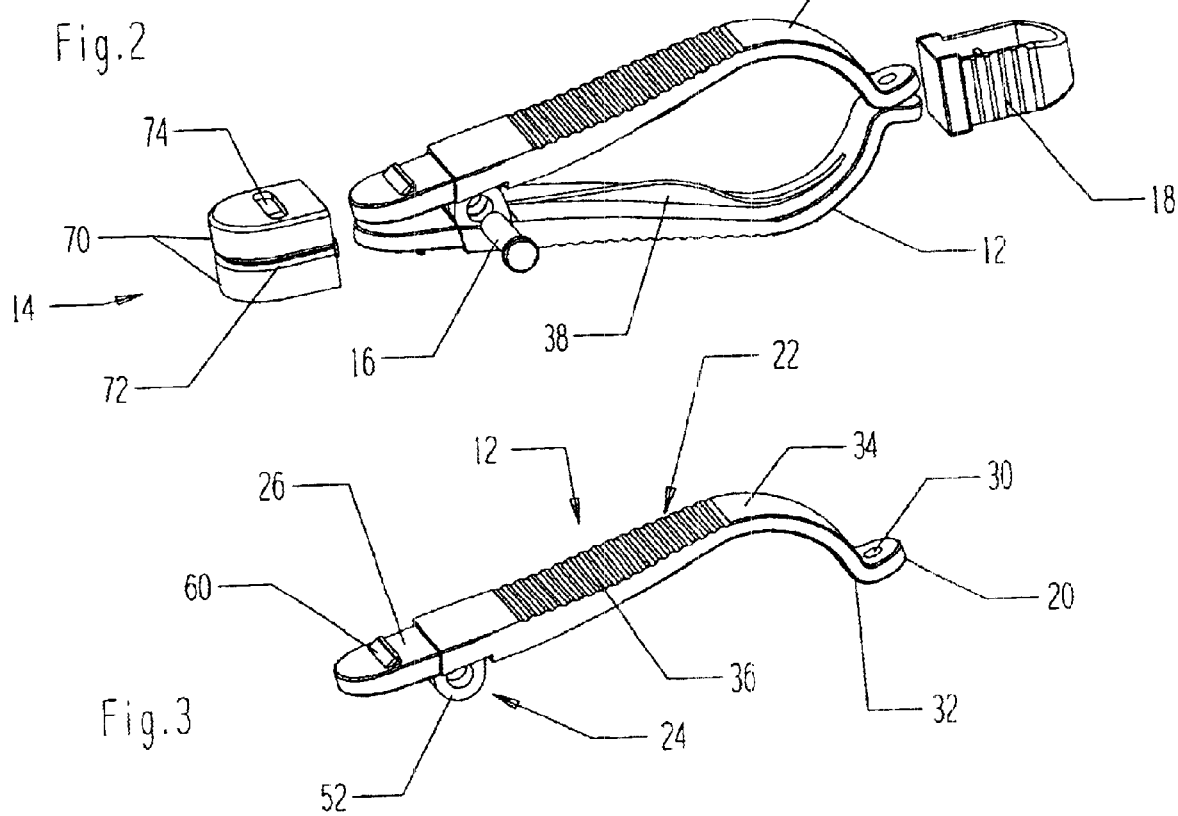
FIG. 1 is a perspective view of a preferred embodiment of the assembled line clamp constructed in accordance with the invention.
FIG. 2 is a perspective exploded view of the components of the line clamp of FIG. 1.
FIG. 3 is a perspective view of an arm of the line clamp of FIG. 1.
Figure 4:
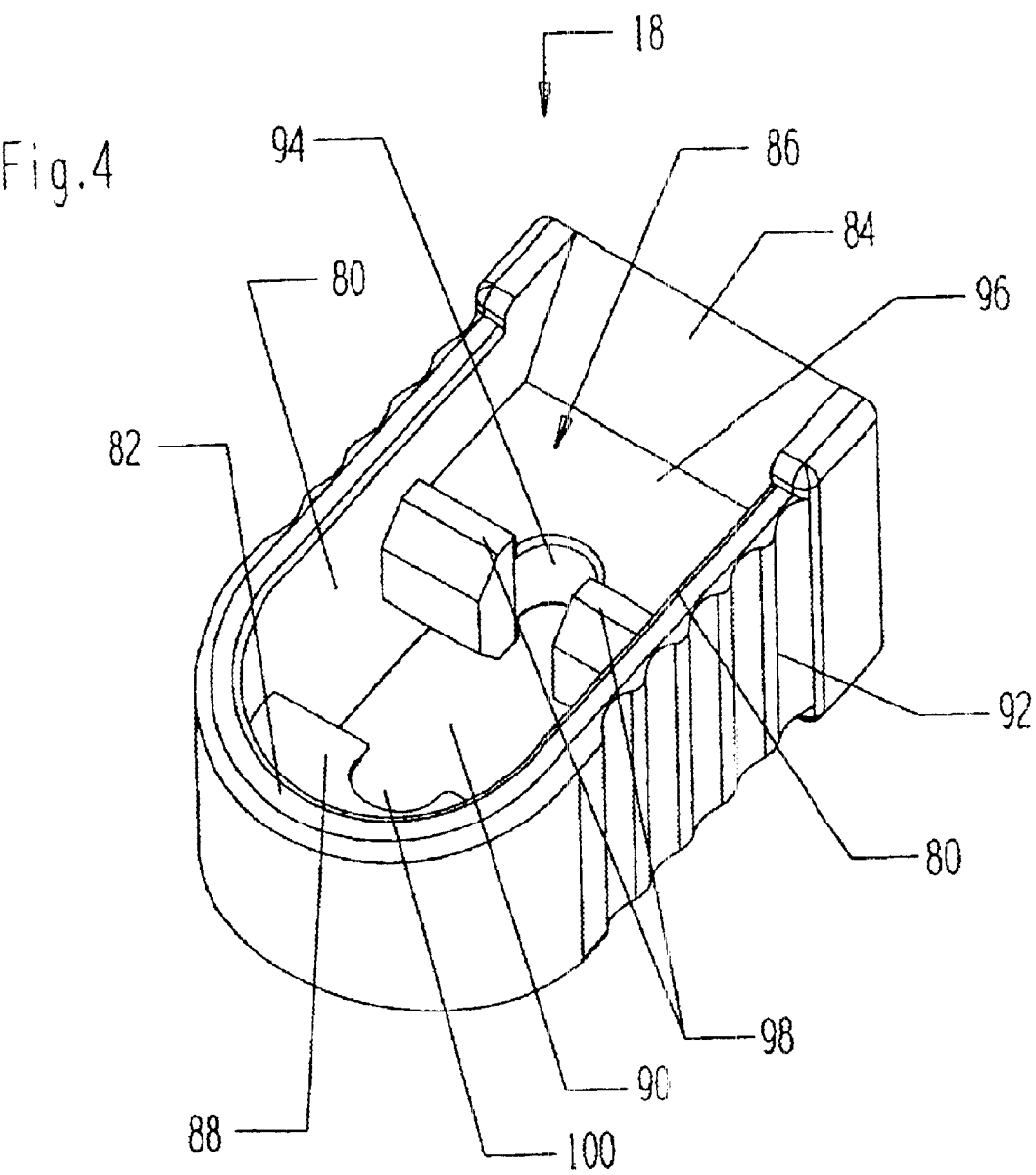
FIG. 4 is a perspective view of a preferred embodiment of the biassing device for the line clamp of FIG. 1.
Figures 5, 6:
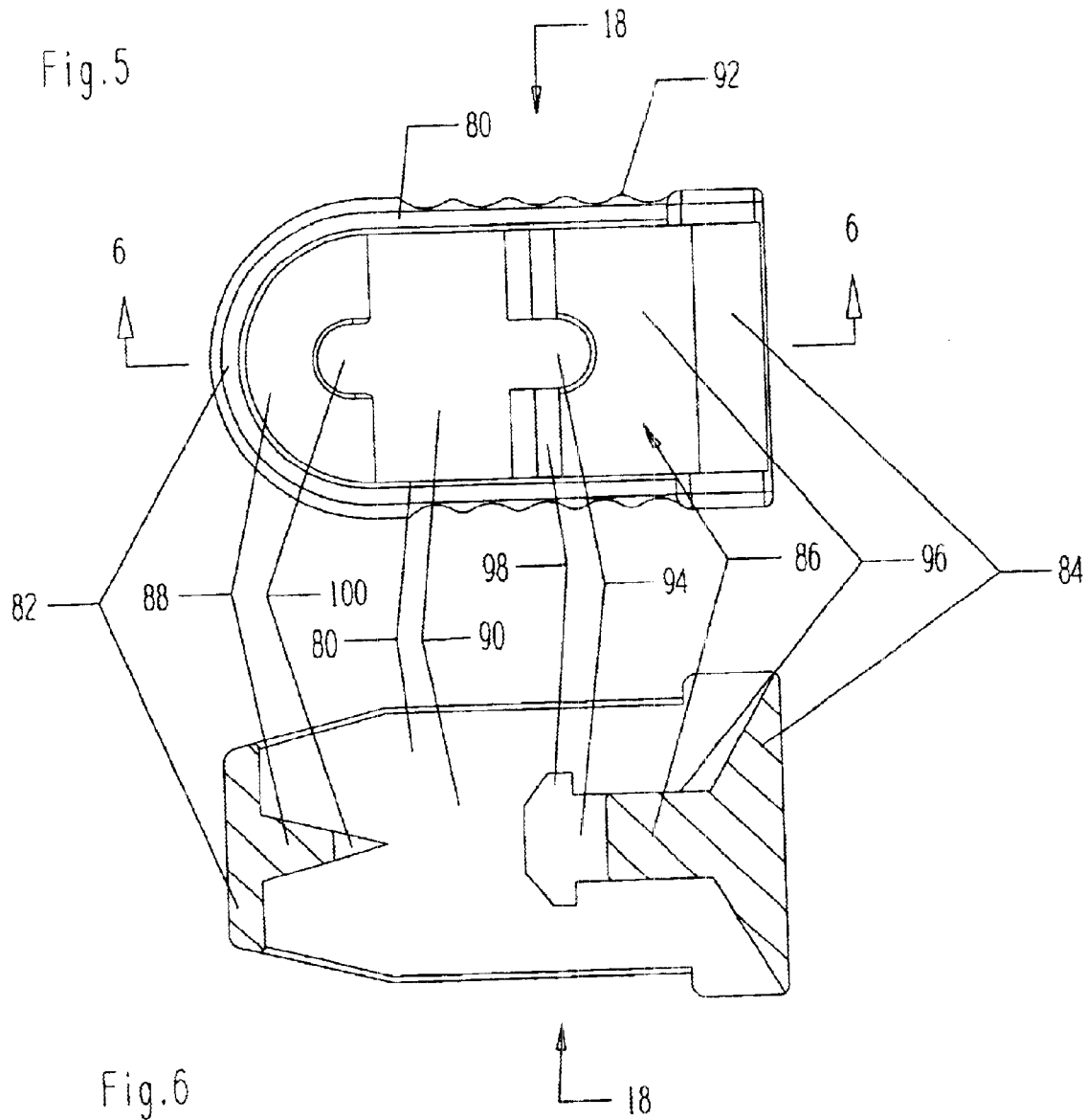
FIG. 5 is an plan view of the biassing device shown in FIG. 4.
FIG. 6 is a transverse sectional view of the biassing device shown in FIG. 5, taken along the line 6—6 in FIG. 5.

Referring to FIGS. 1 and 2, there is shown a line clamp 10 according to the preferred embodiment of the invention, comprising two arms 12, a jacket 14, a pin 16 and a biassing device 18.

The arms 12, are identical to each other, with one being rotated 180 degrees about its longitudinal axis with respect to the other. Each arm 12 (FIG. 3) comprises a compression-adjusting end 20, a grip portion 22, a pivot component 24 and a jaw stub 26.

Each compression-adjusting end 20 has a leader line hole 30 and an inwardly-facing abutting surface 32. In use the leader line (not shown) is passed through the leader line hole 30.

The proximal and distal portions of the compression-adjusting end 20 adjoining the abutting surface 32 bend outwardly so as to smoothly bevel the transversely extending proximal and distal edges of the abutting surface 32.

Each grip portion 22 extends from proximate to the compression-adjusting end 20 to proximate to the pivot component 24. Each grip portion 22 has an outward bulge 34 at its proximal end and, with respect to inward or outward deflection, is substantially straight from the outward bulge 34 to the distal end of the grip portion 22. Each grip portion 22 tapers from wider at its distal end to narrower at its proximal end in both its transverse and inward/outward dimensions. Each grip portion 22 has a washboard hold 36 on its outwardly facing surface. Each grip portion 22 has a proximally/distally-extending, substantially-planar, stiffener 38 disposed normal to, and transversely centred in, its inwardly facing surface. The stiffener 38 extends from proximate to the compression-adjusting end 20 to proximate to the pivot component 24. The stiffener 38 has its greatest inward/outward thickness roughly mid way along its length and smoothly tapers to minimal thickness at each end.

Each pivot component 24 comprises a pair of inwardly-projecting gudgeons 52. The gudgeons 52 are transversely spaced apart a distance roughly equal to the transverse thickness of one gudgeon 52 and each pair is transversely offset from being centred on the transverse centre of the arm 12 a distance roughly equal to half the transverse thickness of one gudgeon 52. This positioning of the gudgeons 52 permits one pair of gudgeons 52 to interlock with the other pair of gudgeons 52 wherein one gudgeon 52 of each pair is interposed between the gudgeons 52 of the other pair.

As shown in FIGS. 1 and 2, the pin 16 is inserted through the two pairs of gudgeons 52. The pin 16 is preferably made of a hard durable plastic, but may be made of a variety of other suitable materials. It is preferable that the pin 16 be resistant to corrosion caused by immersion in fresh or salt water.

Although, it is possible to have only one gudgeon 52 on each arm 12, generally, at least two gudgeons 52 for each arm 12 are required for stability, and more gudgeons 52 may be used at the expense of increased manufacturing costs.

Each jaw stub 26 has a stub projection 60 on its outwardly facing surface. Each stub projection 60 has a proximal side substantially normal to the outwardly facing surface of the jaw stub 26 and a wedge-shaped distal side. In the embodiment shown in FIGS. 1, 2 and 3, the stub projection 60 is a transversely extending projection. In the embodiment shown in FIGS. 7, 8 and 9, the stub projection 60 is an obliquely-truncated cylindrical projection.

The arms 12 are made from a resiliently-bendable material. The shape of the arms 12 permits bending of the arms 12 in the inward/outward dimension and resists bending of the arms 12 in the transverse dimension. It is preferable that the arms 12 be resistant to corrosion caused by immersion in fresh or salt water. The arms 12 are preferably made of a hard resiliently-bendable durable plastic such as acetal, but may also be made from other similarly resiliently-bendable materials.

The jacket 14 is made up of two sheaths 70, each sheath 70 having an outward side, an inwardly-facing jaw surface 72 and an internal cavity, each cavity being sized and shaped to contain a jaw stub 26. The two sheaths 70 are pivotally connected at the proximal edges of their jaw surfaces 72.

The jacket 14 provides jaw surfaces 72 that are soft so that they will tend not to damage the fishing line and that increase the friction between the jaw surfaces 72 and the fishing line, relative to jaws of the same material from which the arms 12 are made, so that the same release tension can be obtained with less compressive force between the jaw surfaces 72. As well the pivotal connection at the proximal edges of the jaw surfaces 72 prevents a fishing line inserted between the jaw surfaces 72 from contacting, and being harmed by or entangled in, the pivot components 24.

It is preferable that the jacket 14 be made of a soft flexible material which is resistant to harm from immersion in fresh or salt water. In the embodiments shown in the drawings, the jacket 14 is made of polyurethane, but it can also be made of other suitable materials.

Each sheath 70 has a sheath hole 74 through its outward side, sized and shaped to engage with the associated stub projection 60 when the jaw stubs 26 are inserted into the sheaths 70. In the embodiment shown in FIGS. 1 and 2, the sheath hole 74 is a transversely extending slot. In the embodiment shown in FIGS. 8 and 9, the sheath hole 74 is circular. During insertion of the jaw stubs 26 into the sheaths 70, the wedge-shaped distal edge of the stub projection 60 outwardly deforms the outward side of the sheath 70, until the stub projection 60 aligns with the sheath hole 74, thereafter the proximal side of the stub projection 60 abuts the proximal side of the sheath hole 74, so as to retain the jaw stub 26 within the sheath 70.

In the embodiment shown in FIGS. 1, 2, 4, 5 and 6, the biassing device 18 has sidewalls 80, a proximal end wall 82, a distal end wall 84, a spacer 86, a centring wedge 88 and an abutment opening 90. The side walls 80 have knurls 92 on their exterior faces to facilitate hand manipulation of the biassing device 18. The proximal end wall 82 is curved, with its distal side roughly conforming to the rounded shape of the proximal tips of the compression-adjusting ends 20.

The spacer 86 is inwardly/outwardly centred on, and contiguous with, the sidewalls 80 and the distal end wall 84. The spacer 86 has a spacer leader notch 94 and two oppositely-disposed outward-facing bearing surfaces 96. Each bearing surface 96 has a active position stabilizer, such as a transversely-extending retainer ridge 98 at its proximal edge. The bearing surfaces 96 are substantially normal to the sidewalls 80. The distal end wall 84 is thicker where it meets the spacer 86 than it is at its outward edges, wherein the proximal faces of the distal end wall 84 slope and meet the spacer 86 at an angle of greater than 90 degrees.

The centring wedge 88 is inwardly/outwardly centred on, and contiguous with, the proximal end wall 82. The centring wedge 88 has a wedge leader notch 100. The centring wedge 88 is thickest at its proximal end and tapers to minimal thickness at its distal edge.

The abutment opening 90 is the space between the sidewalls 80, distal of the centring wedge 88 and proximal of the spacer 86. The spacer leader notch 94 and the wedge leader notch 98 are contiguous with the abutment opening 90.

As shown in FIG. 1, when the line clamp 10 is assembled, the pin 16 is inserted into the gudgeons 52; the jaw stubs 26 are inserted into the jacket 14; and the compression-adjusting ends 20 are disposed within the biassing device 18.

The assembled line clamp 10 is pre-stressed, in that even when the abutting surfaces 32 are abutting each other and nothing is interposed between the jaw surfaces 72, a compressive force exists between the jaw surfaces 72. This is so because the arms 12 and jacket 14 are configured such that compression-adjusting ends 20 and the jaw stubs 26 are outwardly flexed, and the pivot components 24 are inwardly flexed, in the assembled line clamp 10, even when the abutting surfaces 32 are abutting each other and nothing is interposed between the jaw surfaces 72.

In the embodiment shown in FIGS. 1, 2, 4, 5 and 6, the biassing device 18 provides two active positions for the compression-adjusting ends 20 within the biassing device 18: low release tension and high release tension. In the low release tension position, shown in FIG. 1, the proximal tips of the compression-adjusting ends 20 are adjacent to the distal faces of the proximal end wall 82; the abutting surfaces 32 are abutting each other within the abutment opening 90; the outwardly-bent portions of the compression-adjusting ends 20 proximal to the abutting surfaces 32 are disposed on either side of the centring wedge 88; and the leader line, if such has been inserted through the leader line holes 30, is disposed within the wedge leader notch 100. The centring wedge 88 acts to keep the biassing device 18 centred in the inward/outward dimension relative to the compression-adjusting ends 20.

In the high release tension position (not shown), the spacer 86 is interposed between the compression-adjusting ends 20. The abutting surfaces 32 each abut an associated bearing surface 96; the proximal edges of the abutting surfaces 32 are adjacent to the distal sides of the associated retainer ridges 98; the portions of the compression-adjusting ends 20 distal to the abutting surfaces 32 are adjacent to the proximal faces of the distal end wall 84; and the leader line, if such has been inserted through the leader line holes 30, is disposed within the spacer leader notch 94. The increased flexing of the arms 12 caused by interposing the spacer 86 between the compression-adjusting ends results in increased compressive force between the jaw surfaces 72.

In both the low release tension and high release tension positions the sidewalls 80 prevent the biassing device 18 and compression-adjusting ends 20 from moving transversely relative to each other. When the compression-adjusting ends 20 are in the low release tension position, the proximal end wall 82 prevents the biassing device 18 from moving distal relative to the compression-adjusting ends 20, and the spacer 86 and retainer ridges 98 impede, but do not prevent, proximal movement of the biassing device 18 relative to the compression-adjusting ends 20. The outward bend of the distal portions of the compression-adjusting ends 20 adjoining the abutting surfaces 32 permits the spacer 86 and retainer ridges 98 to wedge between, and spread, the compression-adjusting ends 20 when sufficient distal force is applied to the biassing device 18 relative to the arms 12. Similarly, when the compression-adjusting ends 20 are in the high release tension position, the retainer ridges 98 impede, but do not prevent, distal movement of the biassing device 18 relative to the compression-adjusting ends 20. The outward bend of the proximal portions of the compression-adjusting ends 20 adjoining the abutting surfaces 32 permits the retainer ridges 98 to wedge between, and spread, the compression-adjusting ends 20 when sufficient proximal force is applied to the biassing device 18 relative to the arms 12. As well, when the compression-adjusting ends are in the high release tension position, the distal end wall 84 impedes, but does not prevent, the biassing device 18 from moving proximal relative to the compression-adjusting ends 20, so as to permit the biassing device 18 to be removed from between the compression-adjusting ends 20. The sloped proximal faces of the distal end wall 84 wedge between, and spread, the compression-adjusting ends 20 when sufficient proximal force is applied to the biassing device 18 relative to the arms 12.

In use, a leader line (not shown) is threaded through the leader line holes 30 and formed into an eye, typically by crimping a sleeve around the body and tail of the leader line. The user spreads the jaw surfaces 72 by flexing the grip portions 22 inward by hand, typically after ensuring that the compression-adjusting ends 20 are in the low release tension position so as to require less effort to spread the jaw surfaces 72. If the grip portions 22 are flexed inward sufficiently far, the stiffeners 38 will contact each other at their inward edges, preventing further flexing of the grip portions 22 and thereby preventing the grip portions 22 from being weakened or broken due to over-flexing.

The user places a section of fishing line between the jaw surfaces 72 and, when satisfied with the position of the fishing line, releases the grip portion 22 so as to clamp the fishing line between the jaw surfaces 72. Typically, the user carefully positions the fishing line between the jaw surfaces 72 so as to adjust the release tension, in that as with most pivot-based line release clamps, moving the fishing line proximal, and thus closer to the pin 16, increases the release tension and moving the fishing line distal, and thus farther from the pin 16, decreases the release tension.

The user can adjust the release tension by positioning the compression-adjusting ends 20 in the low release tension or the high release tension position in the biassing device 18. The compression-adjusting ends 20 and biassing device 18 make audible clicks as the compression-adjusting ends 20, due to their resilient nature, snap into position. Once the user has, by manipulating the position of the fishing line between the jaw surfaces 72 and adjusting the position of the compression-adjusting ends 20 in the biassing device 18, obtained the desired release tension the user lowers the gear into the water to troll.

Another embodiment of the line clamp, of particular use where a lower release tension, and therefore a smaller line clamp, are required, is shown in FIGS. 7, 8, 9, 10, 11 and 12. As shown in FIG. 7, the peg small compression-adjusting end 200 has an inwardly-projecting peg 202. In the embodiment shown, the peg 202 has curved sides, but is not cylindrical, being larger in the longitudinal dimension than it is in the transverse dimension. The hole small compression-adjusting end 204 has a peg hole 206 sized shaped and positioned to slidably mate with the peg 202 so as to permit the peg small compression-adjusting end 200 and the hole small compression-adjusting end 204 to move inwardly and outwardly relative to each other. The peg 202 has a peg leader line hole 208 through which a leader line (not shown) is inserted during use.

In another embodiment (not shown) the small compression-adjusting ends each have a peg hole. A removable peg, having a leader line bore, a shaft, a shoulder and a head, is inserted into the peg holes. The shaft has a diameter less than the peg holes and passes easily through the peg holes. The shoulder is only long enough to contact one of the peg holes when inserted. The shoulder has a diameter substantially the same as the peg holes. The shoulder must be forced into the peg hole and is frictionally retained within the peg hole. The head has a diameter larger than the peg holes, so as to prevent the removable peg from being inserted past the shoulder. In use, the shoulder is frictionally retained within one peg hole, and the shaft is slidably disposed within the other peg hole wherein the shaft can move inwardly and outwardly within the other peg hole so as to permit the small compression-adjusting ends to move inwardly and outwardly relative to each other.

The small biassing device 220 has small sidewalls 222, a small proximal end wall 224, distal end ridges 226, a thin spacer 228, a thick spacer 230, small retainer ridges 232 and a peg slot 234. The thin spacer 228 has two oppositely-disposed outward-acing thin spacer bearing surfaces 236. The thick spacer 230 has two oppositely-disposed outward-facing thick spacer bearing surfaces 238. In use, the peg 204 is disposed within the peg slot 234; and the small biassing device 220 is positioned so that the small compression-adjusting ends 200 abut either the thin spacer bearing surfaces 236 if the user desires lesser compressive force between the jaw surfaces 72, or the thick spacer bearing surfaces 238 if the user desires greater compressive force between the jaw surfaces 72.

The small sidewalls 222 and small proximal end wall 224 function to prevent relative movement between the small compression-adjusting ends 200 and the small biassing device 220 in much the same manner as the sidewalls 80 and proximal end wall 82 with respect to the compression-adjusting ends 20 and the biassing device 18. However, the distal end ridge 226 is different from the distal end wall 84 in that it plays little role in preventing the small biassing device 220 from moving proximally relative to the small compression-adjusting ends 200, because the distal end ridges 226 project outward relative to the thick spacer bearing surfaces 238, no more than do the small retainer ridges 232. When the small compression-adjusting ends 200 are abutting the thick spacer bearing surfaces 238, proximal movement of the small biassing device 220 relative to the small compression-adjusting ends 220 is prevented by the peg 204 abutting the distal end of the peg slot 234. In this way, the small biassing device 220 is prevented from slipping proximally off the small compression-adjusting ends 200 when the small biassing device 220 is being adjusted from the position where the small compression-adjusting ends 200 abut against the thin spacer bearing surfaces 236 to where the small compression-adjusting ends 200 abut the thick spacer bearing surfaces 238.

Empirical information obtained from downrigger fishing indicates that a desirable range of release tensions (as measured by hanging the line clamp 10 from a leader line, clamping a loop of fishing line between the jaw surfaces 72 and adding weight to the loop of fishing line until the fishing line is released by the line clamp 10) is from 0.25 lb. to 17.5 lb. This range is dependent on, among other things, the fish being sought and the size of fishing line. It has been found that two different sizes of line clamp 10 of the present design will cover this desired range, one providing a range of 0.25 lb. To 2.5 lb. and the other providing a range of 3 lb. to 17.5 lb. The overall design of the line clamp 10, including the thickness of the spacers 86, the resiliency of the arms 12, the thickness of the stiffener 38, the length of the jaw surfaces 72 and the material from which the jacket 14 is made, should reflect these empirically-preferred release tensions.

The foregoing is a description of preferred embodiments of the invention which is given by way of example. The invention is not to be taken as limited to any of the specific features as described, but comprehends all such variations thereof as come within the scope of the appended claims.

What is claimed is:

1. Suitable for use in a line clamp mechanism having resiliently flexible elongate arms, each arm having a distal end and a proximal end, a jaw in the vicinity of the distal end of the arm and presenting an inwardly-facing jaw surface, a compression adjusting means in the vicinity of the proximal end of the arm, a grip portion located between the jaw and the compression-adjusting means, and an inwardly-facing pivot component located between the jaw and the grip portion, and proximate to the jaw, and the arms being pivotally connected together by means of pivotal engagement of a coupling means with the pivot components, wherein the jaw surfaces are in faced opposition, and the arm compression-adjusting means are proximate to each other wherein the jaw surfaces can be pivoted away from each other by pressing the grip portions toward one another, so as to permit the insertion of a fishing line for clamping between the jaw surfaces;

a spacer displaceably interposable between the compression-adjusting means wherein the spacer can be moved along the length of the elongate arms into or out of interposition between the compression-adjusting means, and wherein interposing the spacer between the compression-adjusting means forces the proximal ends of the arms apart so as to outwardly flex the elongate arms, wherein the clamping force between the jaw surfaces is greater when the spacer is interposed between the compression-adjusting means than when no spacer is interposed between the compression-adjusting means.

2. A line clamp mechanism, for releasably clamping a fishing line to a leader line in downrigger fishing, the line clamp mechanism comprising:

(a) a resiliently flexible first elongate arm having a distal end and
   (i) a first jaw in the vicinity of the distal end thereof, said first jaw presenting an inwardly-facing first jaw surface;
   (ii) a proximal first arm compression-adjusting end;
   (iii) a first arm grip portion located between the first jaw and the first arm compression-adjusting end; and (iv) an inwardly-facing first pivot component located between the first jaw and the first arm grip portion, and proximate to the first jaw;

(b) a second elongate arm having a distal end and (i) a second jaw in the vicinity of the distal end thereof, said second jaw presenting an inwardly-facing second jaw surface;

(ii) a proximal second arm compression-adjusting end;

(iii) a second arm grip portion located between the second jaw and the second arm compression-adjusting end; and (iv) an inwardly-facing second pivot component located between the second jaw and the second arm grip portion, and proximate to the second jaw;

(c) coupling means for pivotally connecting the first and second elongate arms together by means of pivotal engagement of the coupling means with the first and second pivot components, wherein the first and second jaw surfaces are in faced opposition, and the first and second arm compression-adjusting ends are proximate to each other;

(d) a removable biassing device for adjusting the spacing between the first and second arm compression-adjusting ends and providing at least two discrete spacing positions, viz a first spacing position and a second spacing position, between the first and second arm compression-adjusting ends, and (e) means for connecting a leader line to at least one of the elongate arms in the vicinity of the proximal end thereof;

wherein, in the first and second spacing positions, the first arm grip portion is outwardly flexed thereby biassing the first and second jaw surfaces together toward a closed clamping position, the clamping force is adjustable by moving the biassing device between the first and second spacing positions, the first arm grip portion is inwardly flexible by means of inwardly-directed force applied to each of the first arm grip portion and the second arm grip portion so as to open the jaw surfaces for insertion of a fishing line between the jaw surfaces: and in use, the biassing device is displaced along the length of the first and second elongate arms between the first and second spacing positions.

3. The line clamp mechanism of claim 2, wherein (a) the biassing device includes a first spacer that provides the first spacing position, the first spacer comprising spaced oppositely disposed outwardly-facing first bearing surfaces; and (b) each compression-adjusting end has an inwardly-facing abutting surface;

wherein, when the first spacer is interposed between the compression-adjusting ends, each first bearing surface is in bearing engagement with an associated one of the abutting surfaces.

4. The line clamp mechanism of claim 3, wherein the second spacing position comprises an abutment opening within which the abutting surfaces can abut each other such that when the abutting surfaces are in the second spacing position, the distance between the abutting surfaces and the resulting clamping force exerted by the jaws is less than that when the abutting surfaces are in the first spacing position.

5. The line clamp mechanism of claim 3, wherein the second spacing position comprises a second spacer having spaced oppositely disposed outwardly-facing second bearing surfaces wherein the distance between the bearing surfaces of the second spacer is different from that of the first spacer, such that when the abutting surfaces are in the second spacing position so that each second bearing surface is in bearing engagement with an associated one of the abutting surfaces, the distance between the abutting surfaces and the resulting clamping force exerted by the jaws is different from that when the abutting surfaces are in the first spacing position.

6. The line clamp mechanism of claim 5, wherein the spacers are positioned adjacent to each other longitudinally in a generally linear series configuration, with the distance between the bearing surfaces of the spacers increasing progressively from one end of the series to the other.

7. The line clamp mechanism of claim 1, wherein the first and second elongate arms in gross shape and configuration are substantial mirror images of one another.

8. A line clamp mechanism, for releasably clamping a fishing line to a leader line in downrigger fishing, the line clamp mechanism comprising:

(a) a resiliently flexible first elongate arm having a distal end and (i) a first jaw in the vicinity of the distal end thereof, said first jaw presenting an inwardly-facing first jaw surface;

(ii) a proximal first arm compression-adjusting end having an inwardly-facing first abutting surface;

(iii) a first arm grip portion located between the first jaw and the first arm compression-adjusting end; and (iv) an inwardly-facing first pivot component located between the first jaw and the first arm grip portion, and proximate to the first jaw;

(b) a resiliently flexible second elongate arm, in gross shape and configuration a substantial mirror image of the first elongate arm, having a distal end and (i) a second jaw in the vicinity of the distal end thereof, said second jaw presenting an inwardly-facing second jaw surface;

(ii) a proximal second arm compression-adjusting end having an inwardly-facing second abutting surface;

(iii) a second arm grip portion located between the second jaw and the second arm compression-adjusting end; and (iv) an inwardly-facing second pivot component located between the second jaw and the second arm grip portion, and proximate to the second jaw;

(c) coupling means for pivotally connecting the first and second elongate arms together by means of pivotal engagement of the coupling means with the first and second pivot components, wherein the first and second jaw surfaces are in faced opposition, and the first and second abutting surfaces are in faced opposition;

(d) a removable biassing device for adjusting the spacing between the first and second abutting surfaces and providing at least two discrete spacing positions, at least a first spacing position and a second spacing position, the biassing device including a first spacer for providing the first spacing position, the first spacer being displaceably interposable between the first and second abutting surfaces and having spaced oppositely disposed outwardly-facing bearing surfaces wherein when the first spacer is interposed between the first and second abutting surfaces each bearing surface is in bearing engagement with an associated one of the abutting surfaces so as to position the abutting surfaces in a spaced apart relationship and outwardly flex the elongate arms; and (e) means for connecting a leader line to at least one of the elongate arms in the vicinity of the proximal end thereof;

wherein in the first and second spacing positions, the arm grip portions are outwardly flexed thereby biasing the first and second jaw surfaces together toward a closed clamping position, the clamping force is adjustable by moving the biassing device between the first and second spacing positions, and the first arm grip portion is inwardly flexible by means of inwardly-directed force applied to each of the first arm grip portion and the second arm grip portion so as to open the jaw surfaces for insertion of a fishing line between the jaw surfaces; and in use, the biassing device is displaced along the length of the first and second elongate arms between the first and second spacing positions.

9. The line clamp mechanism of claim 8, wherein the second spacing position comprises an abutment opening within which the abutting surfaces can abut each other such that when the abutting surfaces are in the second spacing position, the distance between the abutting surfaces, and the resulting clamping force exerted by the jaws, is less than that when the abutting surfaces are in the first spacing position.

10. The line clamp mechanism of claim 9, wherein the biassing device comprises:
  (a) two longitudinally extending sidewalls, each sidewall connected to the spacer at longitudinally extending side edges of the bearing surfaces and extending proximally from the first spacer; and
  (b) a proximal end wall attached to, and extending transversely between, proximal ends of proximal extensions of the side walls;
wherein the abutment opening is between a proximal end of the first spacer and the proximal end wall, and between the sidewalls, such that the when the abutting surfaces abut each other within the abutment opening, the compression adjusting ends are contained between the proximal end of the first spacer and the proximal end wall, and between the sidewalls.

11. The line clamp mechanism of claim 10, wherein:
  (a) tips of the compression-adjusting ends adjacent and proximal to the abutting surfaces are bent outwards; and
  (b) the biassing device further comprises a transversely extending centring wedge inwardly/outwardly centred on, and fixed to, the proximal end wall, said centring wedge being thickest at its proximal end and tapering to minimal thickness at its distal end so as to fit between the outwardly bent compression-adjusting end tips;
wherein the centring wedge acts to keep the biassing device centred on the compression-adjusting ends when the compression-adjusting ends are in the abutment opening.

12. The line clamp mechanism of claim 11, wherein
  (a) the leader line connecting means comprises two aligned holes, one through each of the compression-adjusting ends, through which holes the leader line can be passed to connect the leader line;
  (b) the spacer has a leader line notch contiguous with the abutment opening, within which leader line notch the leader line is disposed when the leader line is installed and when the abutting surfaces are in bearing engagement with the bearing surfaces; and
  (c) the centring wedge has a wedge leader notch contiguous with the abutment opening within which wedge leader notch the leader line is disposed when the leader line is installed and when the compression-adjusting ends are within the abutment opening.

13. The line clamp mechanism of claim 12, wherein the bearing surfaces have transversely-extending, outwardly-projecting ridges along their proximal edges for impeding proximal movement of the biassing device relative to the compression-adjusting ends wherein when the abutting surfaces are in bearing engagement with the bearing surfaces and proximal force is applied to the compression-adjusting ends relative to the biassing device, the compression-adjusting ends will abut the ridges, and when sufficient proximal force is applied the ridges will wedge under the compression-adjusting ends, spreading them and permitting the compression-adjusting ends to move proximally relative to the biassing device.

14. The line clamp mechanism of claim 8, wherein the second spacing position comprises a second spacer having spaced oppositely disposed outwardly-facing second bearing surfaces wherein the distance between the bearing surfaces of the second spacer is different from that of the first spacer, such that when the abutting surfaces are in the second spacing position so that each second bearing surface is in bearing engagement with an associated one of the abutting surfaces, the distance between the abutting surfaces and the resulting clamping force exerted by the jaws is different from that when the abutting surfaces are in the first spacing position.

15. The line clamp mechanism of claim 14, wherein the spacers are positioned adjacent to each other longitudinally in a generally linear series configuration, with the distance between the bearing surfaces of the spacers increasing progressively from one end of the series to the other.

16. The line clamp mechanism of claim 14, wherein:
  (a) each bearing surface has longitudinally extending side edges and transversely extending end edges;
  (b) each bearing surface has longitudinally extending sidewalls at its side edges, the sidewalls being spaced apart from one another by a distance slightly greater than the transverse width of the compression-adjusting ends and the sidewalls being adjacent to the sides of the compression-adjusting ends when the bearing surfaces are in bearing engagement with the abutting surfaces, for preventing the compression-adjusting ends from moving transversely relative to the spacer; and
  (c) the bearing surfaces of spacers having bearing surfaces more widely spaced than an adjacent spacer, have transversely-extending, outwardly-projecting ridges along the end edge adjacent to said adjacent spacer, for impeding longitudinal movement of the compression-adjusting ends relative to the spacers from a position where the abutting surfaces are in bearing engagement with more widely-spaced bearing surfaces to a position where the abutting surfaces are in bearing engagement with more narrowly-spaced bearing surfaces.

17. The line clamp mechanism of claim 16, further comprising:
  (a) a proximal end wall transversely extending across the proximal end edge of the proximal spacer for preventing the biassing device from being removed proximally from the compression-adjusting ends; and
  (b) a distal end wall transversely extending across the distal end edge of the distal spacer for preventing the biassing device from being removed distally from the compression-adjusting ends.

18. The line clamp mechanism of claim 14, wherein:
  (a) one compression-adjusting end has an inwardly projecting peg;
  (b) the other compression-adjusting end has a peg hole aligned with, and slidably matingly engageable with the peg; and
  (c) the biassing device has a longitudinally extending peg slot within which the peg is disposed;
wherein when a longitudinal or transverse force is exerted against the biassing device tending to remove the biassing device from the compression-adjusting ends, the peg abuts the sides of the peg slot so as to prevent removal of the biassing device.

19. The line clamp mechanism of claim 8, wherein:
(a) the leader line connecting means comprises two aligned holes, one through each of the compression-adjusting ends, through which holes the leader line can be passed to connect the leader line; and
(b) the biassing device has a proximally\distally extending leader line opening within which the leader line is disposed when such is connected.

20. The line clamp mechanism of claim 8, wherein at least one of the jaw surfaces is comprised of a high-friction, soft grip material.

21. The line clamp mechanism of claim 20, wherein the soft grip material is polyurethane.

22. The line clamp mechanism of claim 8, wherein both of the jaw surfaces are comprised of a high-friction, soft grip material.

23. The line clamp mechanism of claim 22, wherein each jaw surface is part of one of a pair of sheaths, each sheath removably fitting over, and latching onto, the associated jaw, the sheaths being attached, one to the other, along proximal ends of the jaw surfaces, wherein the attachment inhibits fishing lines that are inserted between the jaws from contacting the pivot components.

24. The line clamp mechanism of claim 23, wherein the sheath material is polyurethane.

25. The line clamp mechanism of claim 8, wherein:
(a) the first pivot component comprises a first gudgeon, having a first gudgeon hole;
(b) the second pivot component comprises a second gudgeon, having a second gudgeon hole, the second gudgeon transversely offset relative to the first gudgeon and positioned so that the first gudgeon hole and second gudgeon hole can be aligned; and
(d) the coupling means comprises a pin inserted through the gudgeon holes.

26. The line clamp mechanism of claim 8, wherein:
(a) the first pivot component comprises a first pair of spaced gudgeons, said first pair of gudgeons having a first pair of gudgeon holes, said first pair of gudgeon holes being aligned;
(b) the second pivot component comprises a second pair of spaced gudgeons, said second pair of gudgeons having a second pair of gudgeon holes, said second pair of gudgeon holes being aligned, the second pair of spaced gudgeons being transversely offset relative the first pair of spaced gudgeons so that one gudgeon of each pair can be interposed between the gudgeons of the other pair, and the first and second pairs of gudgeons being positioned so that the first and second pairs of gudgeon holes can be aligned; and
(d) the coupling means comprises a pin inserted through the first and second pairs of gudgeon holes.

27. The line clamp mechanism of claim 8, wherein the first elongate arm and the second elongate arm are made of plastic.

28. The line clamp mechanism of claim 27, wherein the plastic is acetal resin.

29. The line clamp mechanism of claim 27 wherein the plastic is a composite.

30. The line clamp mechanism of claim 8, wherein the first arm grip portion and the second arm grip portion are bowed outward away from each other.

31. The line clamp mechanism of claim 30 wherein the first arm grip portion and the second arm grip portion each comprise a stiffener longitudinally disposed on an inwardly-facing side, said stiffener being aligned so that when the grip portions are pushed towards each other, the stiffeners will contact each other before any other parts of the grip portions.

32. The line clamp mechanism of claim 8, wherein the transverse width of the compression-adjusting ends is less than the transverse width of the jaws.

33. The line clamp mechanism of claim 8, wherein the transverse width of the compression-adjusting ends is less than the transverse width of the grip portions.

34. The line clamp mechanism of claim 8, wherein the elongate arms are streamlined so as to facilitate minimization of turbulence when propelled through the water.

\* \* \* \* \*